United States Patent [19]

Horikawa et al.

[11] Patent Number: 5,193,646

[45] Date of Patent: Mar. 16, 1993

[54] CENTRALIZED LUBRICATION APPARATUS

[75] Inventors: Yoshiharu Horikawa, Shimizu; Kazuya Kawada, Fukui; Youichi Yamada, Harue, all of Japan

[73] Assignee: Matsuura Machinery Corporation, Fukui, Japan

[21] Appl. No.: 742,991

[22] Filed: Aug. 9, 1991

[30] Foreign Application Priority Data

Apr. 16, 1991 [JP] Japan .................................. 3-84099

[51] Int. Cl.$^5$ .............................................. F16N 27/00
[52] U.S. Cl. ...................................... 184/7.4; 184/6.4; 184/103.1; 137/883
[58] Field of Search ............... 184/7.4, 6.4, 105.1, 184/6, 6.28, 103.1, 103.2, 27.2, 81; 137/883, 569, 563, 571, 572

[56] References Cited

U.S. PATENT DOCUMENTS

| 1,370,641 | 3/1921 | Grant | 184/6.4 |
| 1,997,700 | 4/1935 | Short | 184/6.4 |
| 2,399,546 | 4/1946 | Edge | 137/563 |
| 2,589,431 | 3/1952 | Reed | 137/571 |
| 2,699,842 | 1/1955 | Juettner | 184/7.4 |
| 3,150,548 | 9/1964 | Roberts | 184/6 |
| 3,270,836 | 9/1966 | Rickley | 137/563 |
| 3,470,902 | 10/1969 | Hackman | 137/571 |
| 4,012,012 | 3/1977 | Ligler | 184/6.3 |
| 4,622,988 | 11/1986 | Takimoto et al. | 137/572 |
| 4,686,902 | 8/1987 | Allain et al. | 137/571 |

FOREIGN PATENT DOCUMENTS

| 900088 | 6/1945 | France . |
| 2338378 | 8/1977 | France . |
| 2205905 | 12/1988 | United Kingdom . |

Primary Examiner—James C. Yeung
Assistant Examiner—Alan B. Cariaso
Attorney, Agent, or Firm—Jordan and Hamburg

[57] ABSTRACT

Branch pipes are provided at a plurality of locations along a supply conduit of a lubrication oil circulation system comprising a storage tank, an oil supply pump and the supply conduit. The branch pipes are connected to oil supply tanks via shut-off control valves, thus constituting the oil supply systems. Oil supply devices for apparatuses to be lubricated are connected to the respective oil supply systems.

4 Claims, 1 Drawing Sheet

CENTRALIZED LUBRICATION APPARATUS

BACKGROUND OF THE INVENTION

The present invention relates to a centralized lubrication apparatus and more particularly to an apparatus adapted to supply lubricant oil to a multiplicity of machine tools in a centralized fashion.

It is customary practice in the field of machine tools to provide lubrication systems individually for individual machine tools for supplying lubricant oil.

When a machine tool is continuously operated for an extended period of time, lubrication oil must be replenished due to limited capacity of an oil supply tank of the lubrication system. This replenishment has conventionally been done manually.

With the recent advent of unmanned operation of machine tools, unmanned replenishment of lubrication oil is desired.

When using a plurality of machine tools, if storage tanks and lubrication systems are provided for individual machine tools, then there is the problem of increased space needs and costs.

If one storage tank is connected to the lubrication oil tanks of a plurality of machine tools, the problem relating to increased space need may be solved, but a large pump is then required, which causes another problem.

SUMMARY OF THE INVENTION

Accordingly, an object of the present invention is to eliminate the problems described above and to provide a centralized lubrication apparatus capable of replenishing lubrication oil appropriately and automatically to an oil supply tank for satisfying a multiplicity of apparatuses to be lubricated.

The present invention has solved the problems mentioned above by providing a centralized lubrication apparatus comprising a circulation system having a storage tank, a pump connected to the storage tank adapted to supply lubrication oil and a supply conduit connecting a delivery port of the oil supply pump and a return port of the storage tank, and an oil supply system having branch pipes provided at a plurality of suitable locations along the supply conduit and oil supply tanks connected to the respective branch pipes via shut-off control valves, oil supply devices for the respective apparatuses to be lubricated being connected to respective oil supply tanks.

According to the present invention, lubrication oil is circulated to the circulation system comprising a storage tank, an oil supply pump and an oil supply conduit and, when the level of oil in the oil supply tank relating to a respective apparatus to be lubricated falls below a specified level, the concerned branch pipe will be opened by operation of the respective shut-off control valve, whereby lubrication oil may be supplied to the concerned oil supply tank by the supply conduit of the circulation system. In the circulation system, since lubrication oil is circulated as required, operation of shut-off control valves such as electromagnetic valves makes it possible to replenish lubrication oil easily. Since replenishment of lubrication oil to the respective oil supply tanks may be controlled through opening and closing of the shut-off control valves, high pressure will not be required. Furthermore, since the oil supply pump requires only enough power to supply the lubrication oil to the circulation system, a relatively small pump is sufficient to replenish oil to a multiplicity of apparatuses to be lubricated.

According to the present invention, since only one storage tank is required, the respective oil supply tanks may be of small size, only one oil supply conduit is required and the oil supply pump in the lubrication system requires only enough power for circulating the fluid, many apparatuses to be lubricated may be serviced without requiring considerable pressure and a relatively small pump may be used, resulting in savings of space and cost.

According to the present invention, unmanned operation of a multiplicity of apparatuses may be reliably realized.

The lubrication apparatus according to the present invention may be applied to existing apparatuses such as machine tools by adding the shut-off control valves at the branch pipes. The present invention can be readily applied by connecting or removing the shut-off control valves, even if the apparatuses are relocated.

DESCRIPTION OF THE PREFERRED EMBODIMENTS

Figure 1:
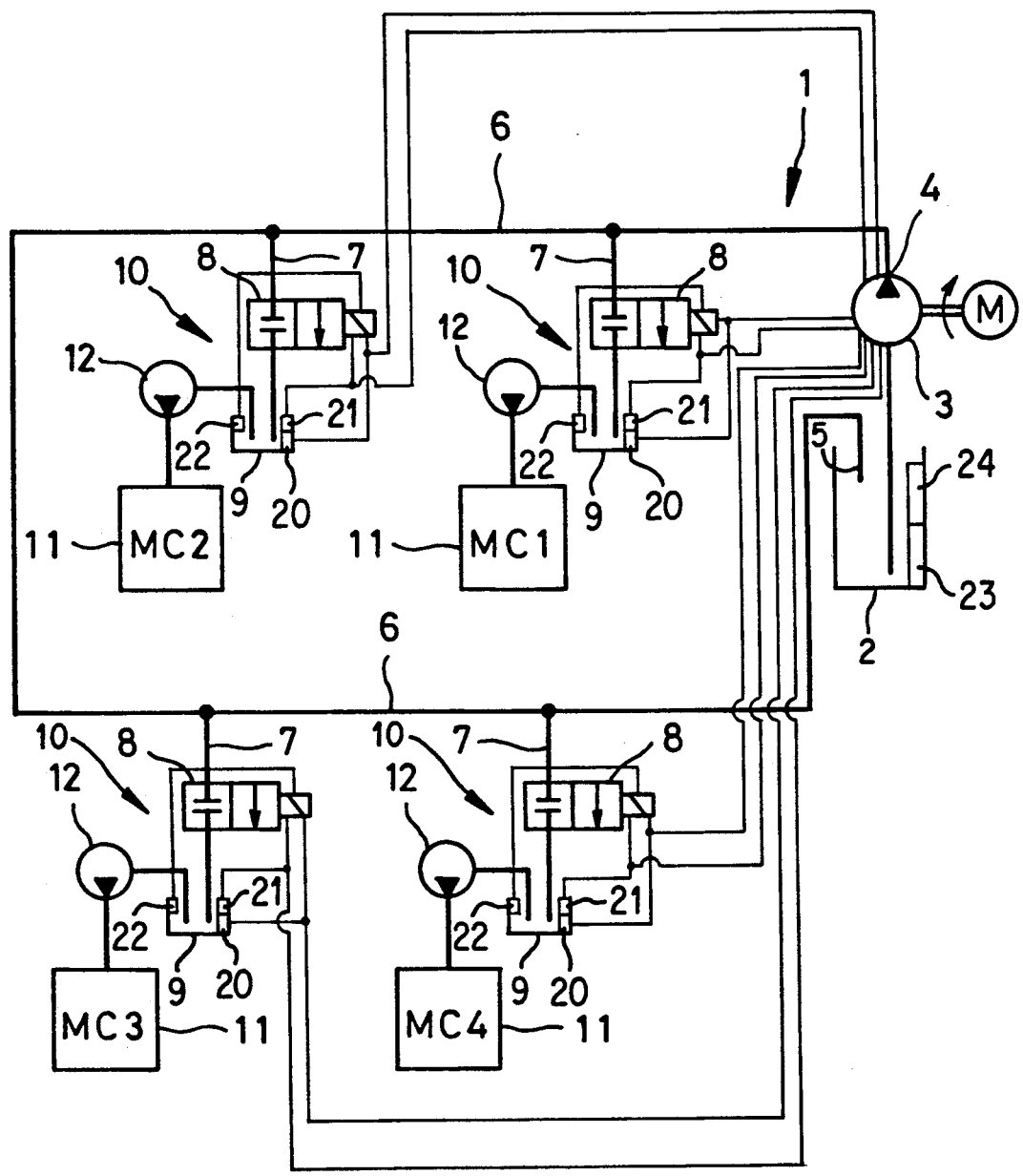
FIG. 1 is a schematic diagram illustrating about the centralized lubrication apparatus according to the present invention.

The present invention will now be explained in detail by referring to the embodiment illustrated in the accompanying drawing.

In FIG. 1, a circulation system 1 comprises a storage tank 2, an oil supply pump 3 connected to the storage tank 2 adapted to suck and deliver lubrication oil from the storage tank 2 and a supply conduit 6 connecting a delivery port 4 of the oil supply pump 3 and a return port 5 of the storage tank 2 and extending through necessary locations.

A plurality (for example, four in the illustrated embodiment of branch pipes 7 are provided at the necessary locations along the supply conduit 6. The number of branch pipes 7 may be suitably selected as necessary.

The respective branch pipes are connected to oil supply tanks 9 for the respective apparatuses to be lubricated via shut-off control valves 8, such as electromagnetic shut-off valves. When the shut-off control valves 8 are opened, the lubrication oil may be supplied to the oil supply tanks 9 from the supply conduit 6.

Respective oil supply systems 10 consist of a branch pipe 7, a shut-off control valve 8 and an oil supply tank 9, and in the case of the illustrated example four of such supply systems are provided.

To the respective oil supply systems 10, there are connected oil supply devices 12 for the respective apparatuses 11 to be lubricated, such as machine tools MC. For simplicity of illustration, the oil supply device 12 is represented only by a pump. For differentiating four of the machine tools MC as separate apparatuses to be lubricated, symbols MC1, MC2, MC3, and MC4 have been employed.

It is to be noted that the oil supply pump 3 is stopped when there is sufficient lubrication oil in the oil supply tanks 9 of the respective machine tools MC.

Level switches are provided in the respective oil supply tanks 9. More specifically, there are provided two or three level switches such as low level switches 20 adapted to issue an oil supply signal indicating that replenishment is required, high level switches 21 adapted to issue a stop signal indicating that lubrication oil is full and replenishment should be stopped, and as required over-flow level switches 22 adapted to indicate that the lubrication oil is in the state of overflowing. The shut-off control valves 8 are opened or closed in accordance with the signals from the respective level switches.

When the lubrication oil is continuously supplied by an oil supply device 12 and an oil supply signal is issued by the low level switch 20 in the oil supply tank 9 for any of the machine tools 11, the oil supply pump 3 is first activated, and after oil is circulated in the circulation system 1, the concerned shut-off control valve 8 is opened so that the lubrication oil is replenished from the supply conduit 6 to the oil supply tank 9. If a stop signal is issued by the high level switch 21 during replenishment of the lubrication oil, the concerned shut-off control valve 8 is switched over and the branch pipe 7 will be closed.

If an oil supply signal is issued from another oil supply tank 11 during replenishment of the lubrication oil by one of the branch pipes, then the respective shut-off control valve 8 is activated so that the concerned branch pipe 7 is opened and the lubrication oil may be replenished. It is a matter of course that a plurality of shut-off control valves 8 may be opened or closed simultaneously.

If stop signal are issued for all supply systems during replenishment of the lubrication oil, all shut-off control valves are closed and subsequently, or after the lapse of a specified time, the oil supply pump 3 is stopped.

In the case of four machine tools, if a tank having a capacity of the order of 10 liters is provided as the oil supply tank 9 for a respective machine tool 11 and a tank having a capacity of the order of 200 liters is provided as the storage tank 2, unmanned operation may be executed as long as a sufficient amount of the lubrication oil is replenished to the storage tank 2 during the day when workers are available, there thus being no fear of shortage of lubrication oil to be supplied during the night work shift.

If a low level switch 23 and a high level switch 24 are provided in the storage tank 2 and, when the level of the oil is lowered below the low level, then the low level switch 23 is activated to indicate the necessity of oil replenishment. If the high level switch 24 is activated, an indication is made to stop of oil replenishment, and replenishment of the lubrication oil is positively performed.

In the illustrated example, lubrication for machine tools has been described. However, centralized lubrication may be employed not only in machine tools but also in various other types of apparatus. Furthermore, although examples of lubrication have been illustrated and the terminology of lubrication has been used, it should be understood that the present invention may be applied not only for oil lubrication but also for machine treatment with any kind of liquid.

What is claimed is:

1. A centralized lubrication apparatus for supplying lubricant to a plurality of apparatuses to be lubricated, each apparatus to be lubricated having a lubricant supply device, comprising a lubricant circulation system having a storage tank including a return port, a lubricant supply pump connected to said storage tank and including a delivery port, and a supply conduit connecting the delivery port of said lubricant supply pump and the return port of said storage tank; and a lubricant supply system having a plurality of branch pipes provided at a plurality of suitable locations along said supply conduit and a plurality of lubricant supply tanks connected to respective branch pipes via a plurality of shut-off control valves, each lubricant supply tank being connected to a respective lubricant supply device of a separate one of said plurality of apparatuses to be lubricated.

2. A centralized lubrication apparatus as in claim 1, wherein said shut-off control valves comprise electromagnetic valves.

3. A centralized lubrication apparatus as in claim 1, wherein each lubricant supply tank includes a plurality of level switches for issuing signals indicating low lubricant level, high lubricant level and lubricant overflow valve in the respective lubricant supply tank, said respective shut-off control valve opening and closing a respective branch pipe in response to said signals.

4. A centralized lubrication apparatus as in claim 1, wherein said storage tank includes a first level switch for indicating low lubricant level in said storage tank, and a second level switch for indicating a filled lubricant level in said storage tank.

* * * * *